United States Patent
Arai et al.

(10) Patent No.: US 7,773,613 B2
(45) Date of Patent: Aug. 10, 2010

(54) COMMUNICATION CONTROL METHOD AND SYSTEM

(75) Inventors: Daisuke Arai, Saitama (JP); Kenji Hori, Saitama (JP); Akira Idoue, Saitama (JP); Takeshi Kouyama, Tokyo (JP); Jun Endou, Tokyo (JP)

(73) Assignee: KDDI Corporation, Tokyo (JP)

( * ) Notice: Subject to any disclaimer, the term of this patent is extended or adjusted under 35 U.S.C. 154(b) by 94 days.

(21) Appl. No.: 12/333,431

(22) Filed: Dec. 12, 2008

(65) Prior Publication Data

US 2009/0154480 A1 Jun. 18, 2009

(30) Foreign Application Priority Data

Dec. 14, 2007 (JP) ............................ P2007-323264

(51) Int. Cl.
*H04L 12/56* (2006.01)
(52) U.S. Cl. ...................................... 370/401; 370/328
(58) Field of Classification Search ................. 370/338, 370/328, 313, 230, 395, 235, 401, 392, 390; 709/208
See application file for complete search history.

(56) References Cited

U.S. PATENT DOCUMENTS

| | | | |
|---|---|---|---|
| 6,400,719 B1 * | 6/2002 | Chimura et al. | 370/395.31 |
| 6,654,792 B1 * | 11/2003 | Verma et al. | 709/208 |
| 6,839,348 B2 * | 1/2005 | Tang et al. | 370/390 |
| 7,027,394 B2 * | 4/2006 | Gupta et al. | 370/230.1 |
| 7,031,314 B2 * | 4/2006 | Craig et al. | 370/392 |
| 7,047,314 B2 | 5/2006 | Sato et al. | |
| 7,324,473 B2 * | 1/2008 | Corneille et al. | 370/328 |
| 2003/0076845 A1 * | 4/2003 | Yokota et al. | 370/401 |
| 2004/0047353 A1 * | 3/2004 | Umayabashi et al. | 370/395.63 |
| 2008/0025243 A1 * | 1/2008 | Corneille et al. | 370/313 |
| 2008/0117884 A1 * | 5/2008 | Ishii et al. | 370/338 |
| 2009/0010163 A1 * | 1/2009 | Isomura et al. | 370/235 |

FOREIGN PATENT DOCUMENTS

| | | | |
|---|---|---|---|
| JP | 2001-016255 A | | 1/2001 |
| JP | 2002-204252 A | | 7/2002 |
| JP | 2003-167805 A | | 6/2003 |
| JP | 2004-179853 A | | 6/2004 |

OTHER PUBLICATIONS

K. Egevang, "The IP Network Address Translator (NAT)", Cray Communications, May 1994, pp. 1-10; Cited in Specification.

* cited by examiner

*Primary Examiner*—Thong H Vu
(74) *Attorney, Agent, or Firm*—Westerman, Hattori, Daniels & Adrian, LLP

(57) ABSTRACT

A switch 1 having a tag VLAN function includes a plurality of physical ports P1, P2 . . . , and adds an ID tag unique to each physical port to the header of a packet received by the physical port and sends the packet, and on the other hand, refers to an ID tag attached to a packet received from a GW 2 and sends the packet to a physical port corresponding to the ID tag. The GW 2 searches for a server address corresponding to the ID tag attached to the packet received from the switch 1 and modifies a destination address of the packet into the server address. In addition, the GW 2 attaches an ID tag corresponding to a source address of the packet received from the shared server 3 to the received packet, and modifies the source address of the packet into a GW address.

3 Claims, 4 Drawing Sheets

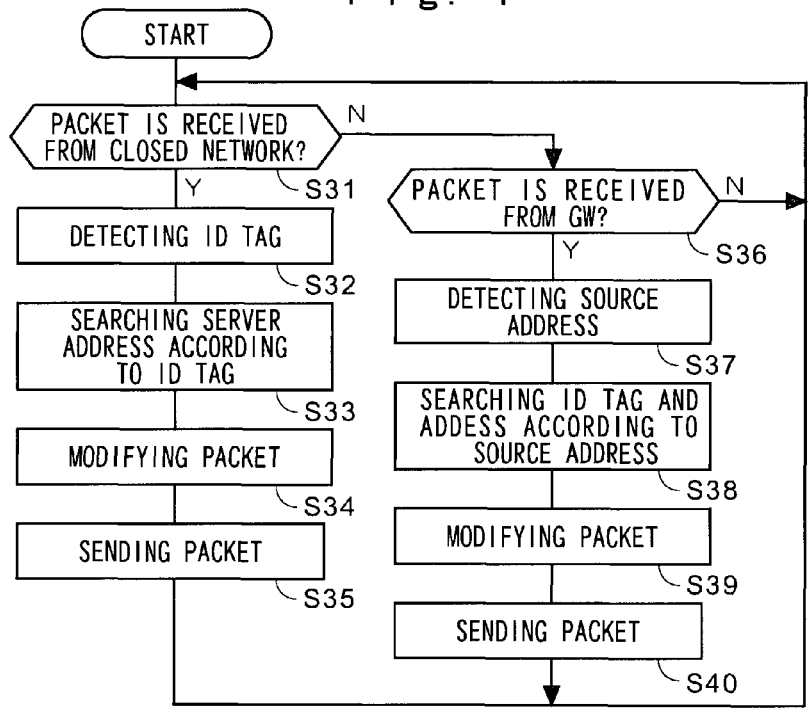
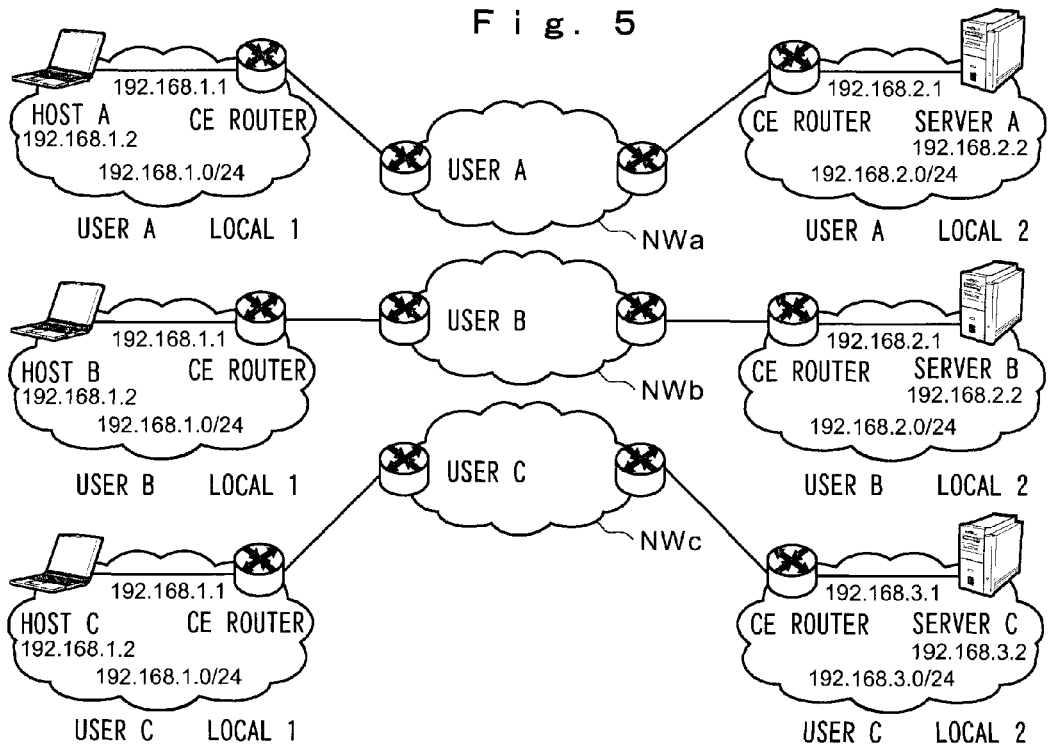

Fig. 6

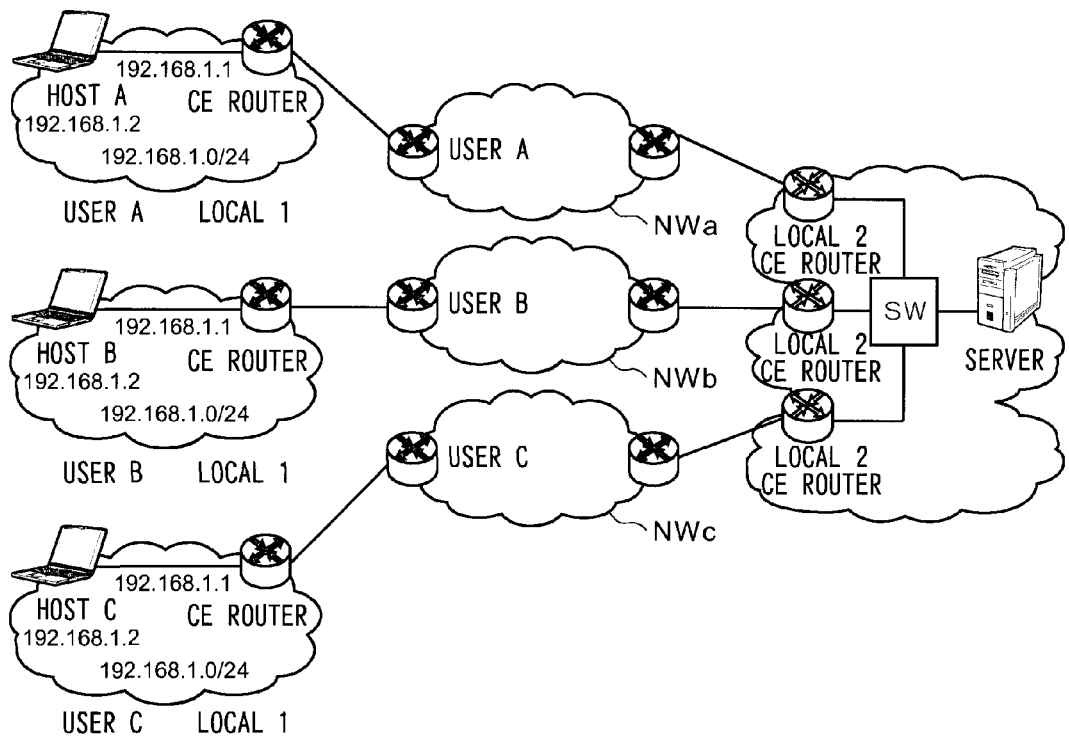

Fig. 7

|  | I | II | III | IV | V |
|---|---|---|---|---|---|
| NON-PATENT DOCUMENT 1 | X | X | O | O | X |
| PATENT DOCUMENT 1 | O | O | X | O | X |
| PATENT DOCUMENT 2 | X | X | O | O | X |
| PATENT DOCUMENT 3 | O | O | O | X | O |
| PATENT DOCUMENT 4 | X | X | O | X | O |
| PRESENT INVENTION | O | O | O | O | O |

I : TO ENABLE COMMUNICATIONS STARTING FROM A SERVER

II : A SERVER CAN UNIQUELY IDENTIFY HOSTS IN THE RESPECTIVE CLOSED NETWORKS.

III : AN IP ADDRESS OF THE SERVER CAN BE FREELY DETERMINED FOR EACH CLOSED NETWORK.

IV : EQUIPMENT WITH A NEW FUNCTION IN AN EXISTING SERVER IS UNNECESSARY.

V : AN IP ADDRESS OF A HOST IN EACH CLOSED NETWORK AS VIEWED FROM THE SERVER IS IDENTICAL TO AN ADDRESS WHICH HAS BEEN USED IN THE CLOSED NETWORK.

COMMUNICATION CONTROL METHOD AND SYSTEM

BACKGROUND OF THE INVENTION

1. Field of the Invention

The present invention relates to a communication control method and system in which one physical server can be shared by a plurality of closed networks while various requests and conditions which cannot be satisfied by conventional techniques are satisfied.

2. Description of the Related Art

As a technique for constructing an intranet and an extranet by using closed networks to secure safety of communications between business bases of a company and between companies, VPN (Virtual Private Network) has spread. Recently, not only big companies but also small-and-medium-sized companies have considered the introduction of closed networks, and users thereof are increasing. When server services are provided to a closed network, as shown in FIG. 5, there is available a method in which servers A, B, and C are installed in closed networks NWa, NWb, and NWc, respectively. However, if a server is provided in each closed network, facility and operational costs increase.

For solving this technical problem, as in an example shown in FIG. 6, it is considered that one shared server is shared by the plurality of closed networks NWa, NWb, and NWc. However, if IP addresses are independently assigned to the respective closed networks NWa, NWb, and NWc, the IP addresses may duplicate. In this case, a plurality of hosts have the same IP address as viewed from the shared server, so that securing of connectivity to the hosts in the respective closed networks from the shared server comes into question. In Non-patent document 1 and Patent documents 1 to 4, in a system in which a plurality of closed networks share one server, a technique for solving duplication of IP addresses of hosts is disclosed.

Non-patent document 1 discloses, by using a situation of connection of a LAN to the Internet as a typical example, a technique for converting a private IP address to be used by the LAN side into a global IP address to be used by the Internet side.

Patent document 1 discloses, to realize communications between a plurality of closed networks and a server, a technique for enabling communications between a host and a server by assigning a unique IP address identifiable on the server side to a pair of the host in a closed network and the closed network and managing it, and making this IP address correspondent to an IP address assigned to the host in the closed network.

Patent document 2 discloses, to realize communications between hosts in a plurality of closed networks and a server, a technique for assigning an IP address that the server can uniquely identify for a pair of an ID for identifying a closed network and an IP address which is likely to be duplicated for a host in a closed network.

Patent document 3 discloses, to identify closed networks of the respective hosts, a technique for attaching an ID tag unique to each closed network to a packet to be transmitted from a host, and when the server receives the packet, identifying a source host according to the ID tag, and based on this ID tag, controlling packet transfer to a started server application of each user. This Patent document 3 also discloses a technique for attaching an ID tag unique to each user to a packet to be transmitted from a server application and then transmitting the packet when a server makes a connection to a host in a closed network.

Patent document 4 discloses a technique for realizing a response from a server to a host in a closed network having a duplicate IP address by setting a MAC address of a source gateway in a layer 2 frame of a received packet as a destination MAC address in the layer 2 frame regardless of an IP address of the response destination.

Non-patent document 1: RFC1631 "The IP Network Address Translator"

Patent document 1: Japanese Published Unexamined Patent Application No. 2001-16255

Patent document 2: Japanese Published Unexamined Patent Application No. 2002-204252

Patent document 3: Japanese Published Unexamined Patent Application No. 2003-167805

Patent document 4: Japanese Published Unexamined Patent Application No. 2004-179853

In the technique of Non-patent document 1, address conversion is dynamically performed in response to a connection request from a host in a closed network to a server, so that communications starting from the server are not possible. Further, the server cannot identify the closed network, so that it is difficult to provide services and information unique to each closed network.

In the above-described technique of Patent document 1, IP addresses of the server as viewed from the respective closed networks must be made different from each other, so that a user cannot freely determine the IP address of the server.

In the technique of Patent document 2, connection to a host in an arbitrary closed network from a server cannot be guaranteed, and the server cannot identify the closed network, so that it is difficult to provide services and information unique to each closed network.

In the technique of Patent document 3, a server must be equipped with a function for identifying an ID tag, a function for packet transfer to a specific server application by means of an ID tag, and a function for attaching an ID tag to each user in the case of sending from the server, so that it is difficult to divert a server which has already been used and applications thereof.

In the technique of Patent document 4 described above, in a general protocol stack, equipment to which the packet is transferred next is determined according to a destination IP address, and a MAC address of the destination is determined. Therefore, to realize the technique of Patent document 4, implementation of special routing of the layer 2 frame in the server is necessary, and it is difficult to divert a server which has already been used and applications thereof. Further, it is difficult to establish communications starting from the server.

Summarizing these, as listed in FIG. 7, to share one physical server by a plurality of closed networks, it is preferable that the following requirements (1) to (5) are satisfied, however, there is conventionally no technique satisfying all of these requirements:

(1) To enable communications starting from a server.

(2) A server can uniquely identify hosts in the respective closed networks.

(3) An IP address of the server can be freely determined for each closed network.

(4) Equipment with a new function in an existing server is unnecessary.

(5) An IP address of a host in each closed network as viewed from the server is identical to an address which has been used in the closed network.

SUMMARY OF THE INVENTION

An object of the present invention is to provide a communication control method and system which solve the above-described problems of the conventional techniques, and while satisfying various requirements and conditions, enables one physical server to be shared by a plurality of closed networks.

To achieve the above-described object, according to the present invention, in a communication control system in which packet exchange between a plurality of closed networks and a physically one shared server is controlled and server addresses unique to the respective closed networks are assigned to the shared server, the following means are taken:

(1) the communication control system includes: a switch having a plurality of physical ports to be connected to the respective closed networks and a gateway side port; and a gateway connected between the switch and the shared server, wherein the switch includes: means for attaching an ID tag unique to each physical port to a packet input from each physical port and outputting it from the gateway side port; and means for outputting the packet input from the gateway side port, from the physical port corresponding to the ID tag attached to the packet, and the gateway includes: a conversion table for managing correspondences between ID tags and server addresses; means for detecting an ID tag attached to a packet addressed to the gateway received from the switch; a first searching means for searching for a server address corresponding to the detected ID tag from the conversion table; a first packet modifying means for modifying a destination address of the packet into the searched server address; a second searching means for searching for an ID tag corresponding to a source address of a packet addressed to a closed network received from a shared server from the conversion table; and a second packet modifying means for attaching the searched ID tag to the packet received from the shared server and modifying the source address into a gateway address.

(2) To the gateway, gateway addresses unique to the respective closed network are assigned, and the conversion table of the gateway manages correspondences among the ID tags, gateway addresses, and server addresses, the second searching means searches for an ID tag and a gateway address corresponding to a source address of a packet received from the shared server from the conversion table, and the second packet modifying means attaches the searched ID tag to the packet received from the shared server and modifies the source address thereof into the searched gateway address.

According to the present invention, a plurality of closed networks are connected to different physical ports of a switch equipped with a tag VLAN function, and address conversion is performed based on an ID tag to be attached to a packet according to the physical port and a server IP address assigned in advance to each closed network in the shared server, so that the following effects are obtained.

(1) Between each closed network and the shared server, address conversion is performed based on only fixed information set in advance, so that the shared server can make a communication starting from the server only by setting its own IP address as a source address and setting an IP address of a partner host as a destination address.

(2) A destination address of a packet addressed to the shared server from each host is modified into a server address made correspondent to an ID tag of the packet in the gateway, so that even when the same address is assigned to the hosts of the closed networks, the shared server can uniquely identify a partner host based on the destination address of the received packet.

(3) In each host, a destination address of a packet addressed to the shared server is set to an address of the gateway, and in the gateway, the destination address of the received packet is modified into a server address made correspondent to the ID tag, so that a destination address of a packet addressed to the shared server from each host can be freely set.

(4) To the shared server, only assignment of a plurality of addresses by using a general-purpose application (IP alias) is sufficient, and addition of a unique function is not necessary.

(5) A host is identified by referring to not only an IP address of this host but also an identifier for identifying a closed network of the host attached by the switch having the tag VLAN function to which the closed network of the host is connected, so that each host can be identified even while the address in each closed network is maintained as the IP address of the host.

BRIEF DESCRIPTION OF THE DRAWINGS

FIG. 4 is a flowchart showing operations of GW;

FIG. 5 is a view showing a conventional network composition which provides server services to closed networks;

FIG. 6 is a view showing a conventional network composition in which closed networks share a server; and FIG. 7 is a view of comparison in function between the present invention and prior art.

DETAILED DESCRIPTION OF THE PREFERRED EMBODIMENTS

Figure 1:
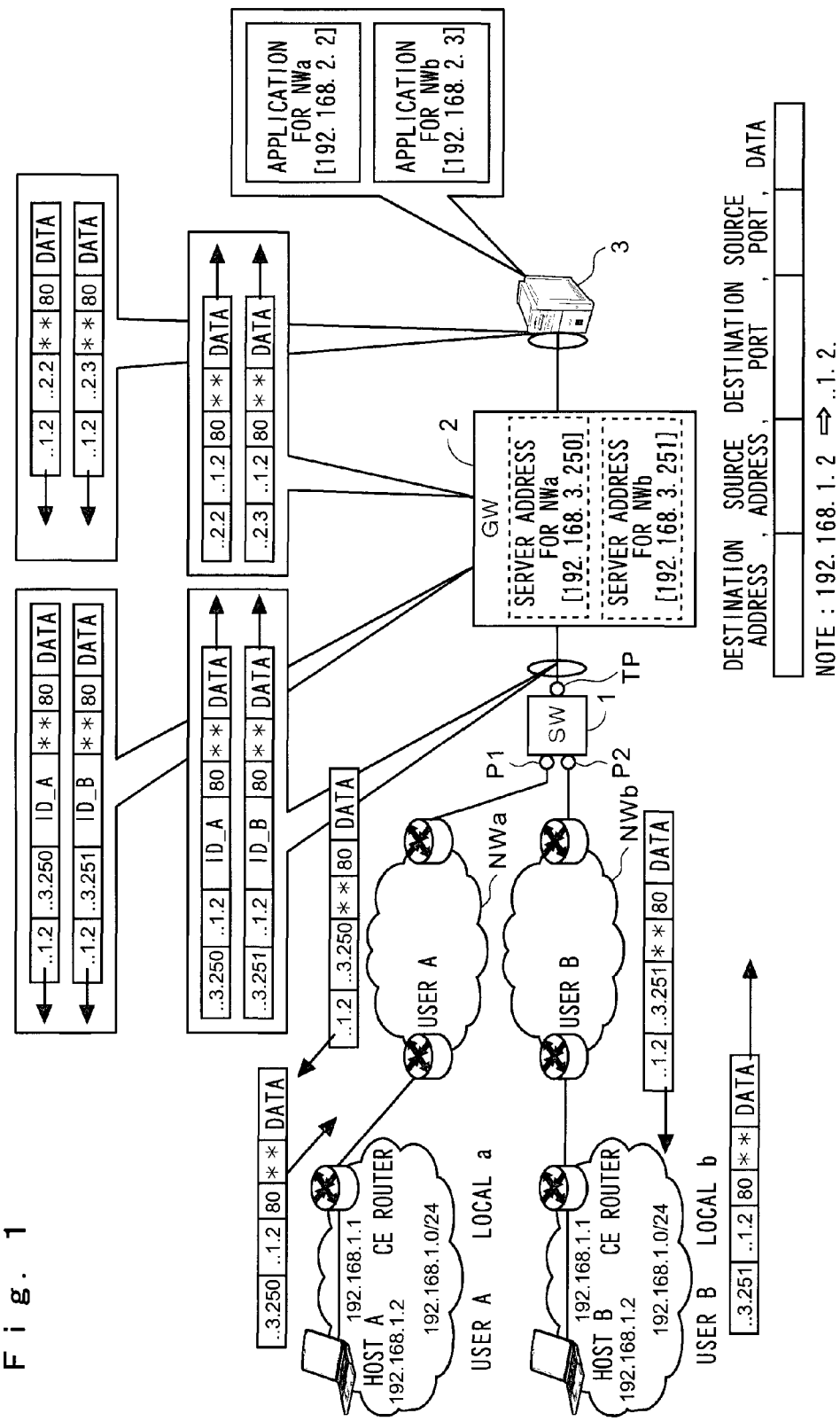
FIG. 1 is a block diagram showing a structure of a network communication system of the present invention.

FIG. 1 is a block diagram showing a structure of a communication control system of the present invention, and herein, a system in which two closed networks NWa and NWb share one shared server 3 is described by way of example.

A local network a of a user A is connected to a physical port P1 of a switch (SW) 1 via its CE router and a closed network NWa to which the user A belongs, and a local network b of a user B is connected to a physical port P2 of SW1 via its CE router and a closed network NWb to which the user B belongs.

The SW1 is equipped with a tag VLAN function compliant with IEEE802.1q, has a plurality of physical ports P1, P2 . . . to which the respective closed networks are connected, and adds an ID tag unique to each physical port to a header of a packet received by the physical port and sends it from a predetermined trunk port TP to the gateway side, and on the other hand, refers to an ID tag attached to a response packet received from the TP port of the gateway side and sends the response packet to a physical port corresponding to the ID tag.

A gateway (GW) 2 is connected between the SW1 having the tag VLAN function and the shared server 3 and performs address conversion and attaches/deletes an ID tag to/from a packet. In the present embodiment, to make it possible to freely set a server address in each closed network NWa, NWb, the GW 2 is equipped with an IP alias function, and IP addresses ([192.168.3.250], [192.168.3.251] different among closed networks are assigned to physically one interface, however, if server IP addresses as viewed from the respective closed networks are allowed to be specified to only one address, this IP alias function is not necessary.

The shared server 3 has server applications independent among closed networks, to a logic device interface of each server application, a server IP address unique to each closed network is assigned by using the IP alias function. Herein, a server IP address [192.168.2.2] is assigned to the logic device interface of the server application which communicates with the closed network NWa of the user A, and a server IP address [192.168.2.3] is assigned to the logic device interface of the server application which communicates with the closed network NWb of the user B.

Figure 2:
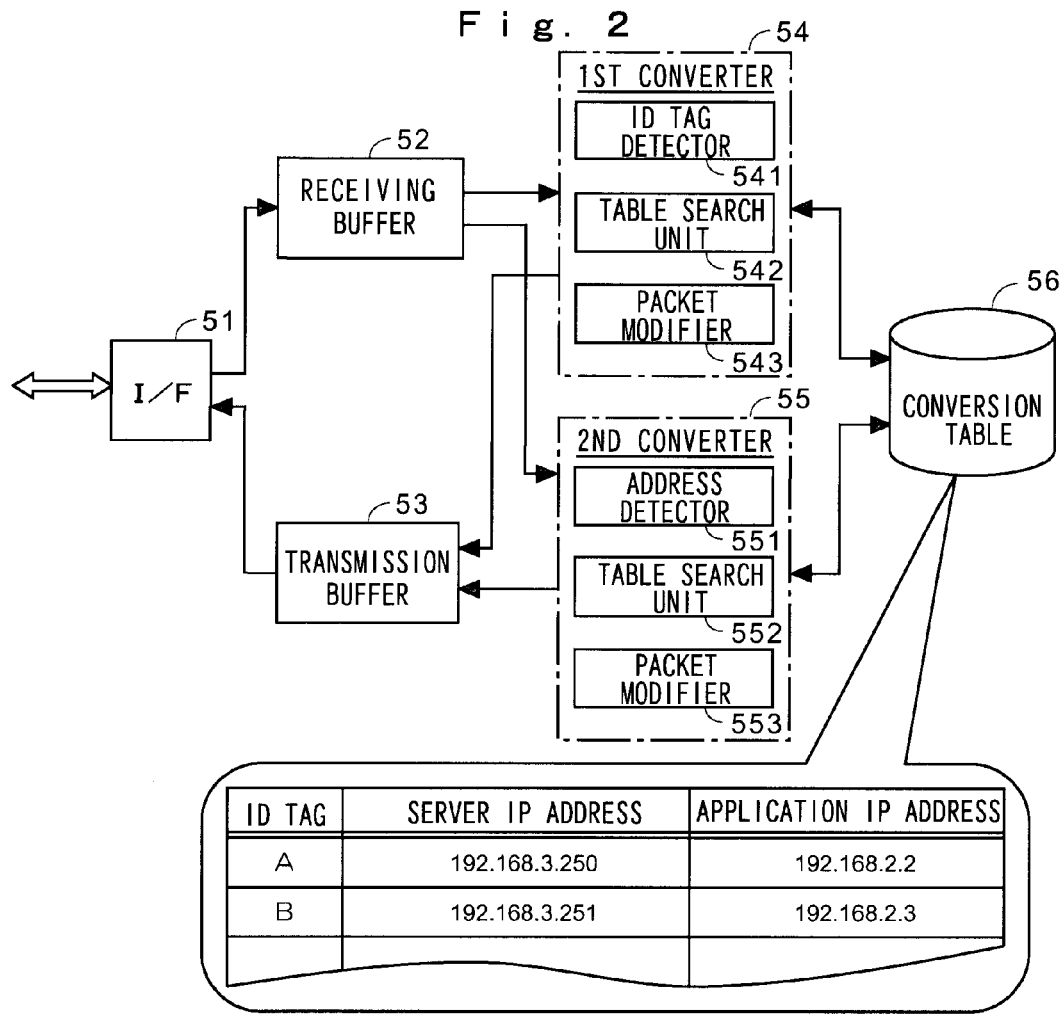
FIG. 2 is a functional block diagram showing a structure of a major section of GW.

FIG. 2 is a functional block diagram showing a structure of a major section of the GW 2, and a packet input from an interface 51 is temporarily stored in a receiving buffer 52, and thereafter, a packet received from SW1 is sent to a first converter 54 and processed, and a packet received from the shared server 3 is sent to a second converter 55 and processed. In a conversion table 56, correspondences among ID tag, IP addresses of the GW 2 from the respective closed networks (hereinafter, referred to as viewed-from-closed-network server IP addresses), and server application IP addresses assigned to the respective applications which the shared server 3 provides for the respective closed networks NWa and NWb) are stored in advance.

In the first converter 54, an ID tag detector 541 detects an ID tag added to the header of a received packet. A table search unit 542 searches for a server application IP address corresponding to the detected ID tag from the conversion tables 6. A packet modifier 543 modifies a destination address of the received packet into the searched server application IP address, and deletes the ID tag attached to the packet. The received packet whose destination address was modified is transferred to the shared server 3 from a transmission buffer 53 via the interface 51.

In a second converter 55, an address detector 551 detects a source address of the packet transferred from the shared server 3. A table search unit 552 searches for an ID tag and a viewed-from-closed-network server IP address corresponding to the detected source address from the conversion table 56. A packet modifier 553 adds the searched ID tag to the header of the packet, and modifies the source address of the packet into the viewed-from-closed-network server IP address. The packet which was attached with the ID tag and whose source address was modified is transferred to the SW1 from a transmission buffer 53 via the interface 51.

Figure 3:
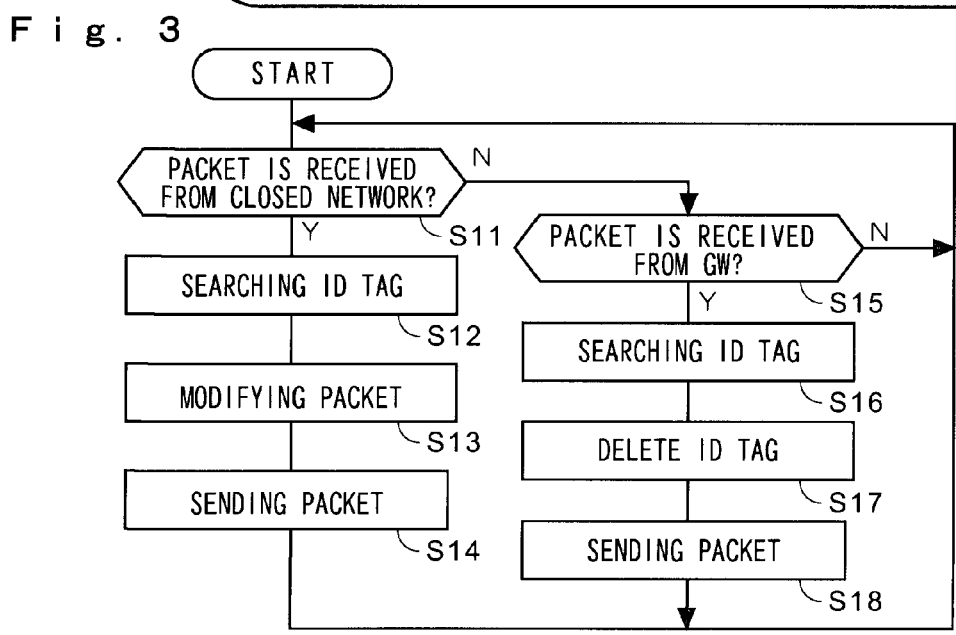
FIG. 3 is a flowchart showing operations of a switch having a tag VLAN function.

Next, operations of the present embodiment will be described with reference to the flowcharts of FIG. 3 and FIG. 4. FIG. 3 is a flowchart showing operations of the tag SW 1, and FIG. 4 is a flowchart showing operations of the GW 2. Here, first, operations of the present embodiment will be described by using the case where a packet is transmitted from the host A of FIG. 1 to the shared server 3 by way of example.

From the CE router of the host A, a packet having an IP address (viewed-from-closed-network server IP address) [192.168.1.2] of the GW 2 registered in a destination address field of the header, and the IP address [192.168.1.2] of the host A registered in a source address field is transmitted. This packet is input into the physical port P1 of the SW 1 via the closed network NWa.

In the SW1, when receiving of the packet is detected in Step S11 of FIG. 3, the process advances to Step S12, and an ID tag made correspondent to the port P1 which received the packet is searched. Here, description is continued by assuming that the ID tag "A" was searched. In Step S13, this ID tag "A" is added to the header of the received packet. In Step S14, this received packet is set from the trunk port TP to the GW side.

Advancing to the flowchart of FIG. 4, in the GW 2, when the packet is received in Step S31, the process advances to Step S32, and the ID tag added to the header is detected by an ID tag detector 541 of the first converter 54. In Step S33, a server application IP address made correspondent to the ID tag is searched from the conversion table 56 by the table search unit 542. Here, [192.168.2.2] is searched as the server application IP address. In Step S34, the destination address of the received packet is modified into the server application IP address by the packet modifier 543, and the ID tag attached to the header is deleted. In Step S35, the received packet is transferred to the shared common server from the interface 51 via the transmission buffer 53.

The shared server 31 processes the packet received from the GW2 by an application made correspondent to the destination address of the packet (server application IP address) and replies with a response packet.

In the GW 2, when the response packet is received in Step S36 of FIG. 4, the process advances to Step S37, and when the source address [192.168.2.2] thereof is detected by an address detector 551 of the second detector 55. In Step S38, the ID tag "A" and the viewed-from-closed-network server IP address [192.168.3.50] made correspondent to the source address identification result are searched from the conversion table 56 by the table search unit 552. In Step S39, by the packet modifier 553, the searched ID tag "A" is attached to the header of the response packet and the source address of the response packet is modified into the viewed-from-closed-network server IP address [192.168.3.250]. In Step S40, this response packet is transferred to the SW 1 from the interface 51 via the transmission buffer 53.

In the SW 1, when the response packet is received in Step S15 of FIG. 3, the process advances to Step S16, and the identification tab "A" thereof is detected. In Step S17, this ID tag is deleted from the header. In Step S18, the response packet is sent from the physical port P1 corresponding to the detected ID tag "A". In other words, the response packet is transferred to the closed network NWa.

Next, operations of the present embodiment will be described by using a case where a packet is transmitted from the host B of FIG. 1 to the shared server 3 by way of example.

From the CE router of the host B, a packet having the IP address (viewed-from-closed-network server IP address) [192.168.3.251] of the GW 2 registered in a destination address field of the header, and the IP address [192.168.1.2] of the host B registered in a source address field, is transmitted.

In the SW 1, when receiving of the packet is detected in Step S11 of FIG. 3, the process advances to Step S12, and an ID tag "B" made correspondent to the port P2 which received the packet is searched. In Step S13, this ID tag "B" is attached to the header of the received packet. In Step S14, this received packet is sent to the shared server side from the trunk port TP.

Advancing to the flowchart of FIG. 4, in the GW 2, when the packet is received in Step S31, the process advances to Step S32, and the ID tag "B" attached to the header is detected. In Step S33, a server application IP address made correspondent to the ID tag "B" is searched from the conversion table 56. Here, [192.168.2.3] is searched as the server application IP address. In Step S34, the destination address of the received packet is modified into the server application IP address, and the ID tag "B" attached to the header is deleted.

In Step S35, this received packet is transferred to the shared common server from the interface 51 via the transmission buffer 53.

The shared server 3 processes the packet received from the GW 2 by an application made correspondent to the destination address (server application IP address) of the packet, and replies with a response packet.

In the GW 2, when the response packet is received in Step S36 of FIG. 4, the process advances to Step S37, and the source address [192.168.2.3] of the packet is detected. In Step S38, the ID tag "B" and the viewed-from-closed-network server IP address [192.168.3.251] made correspondent to the source address identification result are searched from the conversion table 56. In Step S39, the searched ID tag "B" is attached to the header of the received packet, and the source address of the response packet is modified into the viewed-from-closed-network server IP address [192.168.3.251]. In Step S40, this response packet is transferred to the SW 1 from the interface 51 via the transmission buffer 53.

In the SW1, when the response packet is received in Step S15 of FIG. 3, the process advances to Step S16, and the ID tag "B" is detected. In Step S17, this ID tag is deleted from the header. In Step S18, the response packet is sent from the physical port P2 corresponding to the detected ID tag "B." In other words, the response packet is transferred to the closed network NWb.

What is claimed is:

1. A communication control system which controls packet exchange between a plurality of closed networks and physically one shared server, where server addresses unique to the respective closed networks are assigned to the shared server, comprising:
    a switch having a plurality of physical ports to be connected to the respective closed networks and a gateway side port; and
    a gateway connected between the switch and the shared server, wherein
    the switch includes:
    means for attaching an ID tag unique to each physical port to a packet input from each physical port and outputting it from the gateway side port; and means for outputting the packet input from the gateway side port, from the physical port corresponding to the ID tag attached to the packet, and
    the gateway includes:
    a conversion table for managing correspondences between ID tags and server addresses;
    means for detecting an ID tag attached to a packet addressed to the gateway received from the switch; a first searching means for searching for a server address corresponding to the detected ID tag from the conversion table;
    a first packet modifying means for modifying a destination address of the packet into the searched server address; a second searching means for searching for an ID tag corresponding to a source address of a packet addressed to a closed network received from a shared server from the conversion table; and
    a second packet modifying means for attaching the searched ID tag to the packet received from the shared server and modifying the source address into a gateway address.

2. The communication control system according to claim 1, wherein
    to the gateway, gateway addresses unique to the respective closed networks are assigned,
    the conversion table of the gateway manages correspondences among the ID tags, gateway addresses, and server addresses,
    the second searching means searches for an ID tag and a gateway address corresponding to a source address of a packet received from the shared server from the conversion table, and
    the second packet modifying means attaches the searched ID tag to the packet received from the shared server and modifies the source address thereof into the searched gateway address.

3. A communication control method in which a plurality of closed networks are connected to physically one shared server via a switch and a gateway, and server addresses unique to the respective closed networks are assigned to the shared server, comprising the steps of:
    a host in a closed network transmitting a packet including a host address as a source address and a gateway address as a destination address, as a packet addressed to the shared server;
    the switch attaching an ID tag unique to the physical port to a packet input into a physical port from a closed network and transferring the packet;
    the gateway searching a server address corresponding to the ID tag attached to the packet received from the switch; and
    the gateway modifying the destination address of the packet into the searched server address and transferring the packet;
    the shared server transmitting a packet including the server address as a source address and the host address as a destination address;
    the gateway searching an ID tag corresponding to the source address of the packet received from the shared server;
    the gateway attaching the searched ID tag to the packet received from the shared server, modifying the source address of the packet into a gateway address, and transferring the packet; and
    the switch transferring the packet received from the gateway from a physical port corresponding to the ID tag attached to the packet.

* * * * *